United States Patent
Lauer

(10) Patent No.: US 7,765,549 B1
(45) Date of Patent: Jul. 27, 2010

(54) DISTRIBUTING BATCHES OF ITEMS IN A WORKFLOW

(75) Inventor: Steven Paul Lauer, Heber City, UT (US)

(73) Assignee: Affiliated Computer Services, Inc., Dallas, TX (US)

( * ) Notice: Subject to any disclaimer, the term of this patent is extended or adjusted under 35 U.S.C. 154(b) by 1406 days.

(21) Appl. No.: 10/881,333

(22) Filed: Jun. 30, 2004

(51) Int. Cl.
*G06F 9/46* (2006.01)
*G06F 17/30* (2006.01)
*G06F 15/16* (2006.01)

(52) U.S. Cl. ............... 718/101; 718/100; 707/705; 709/201; 709/232

(58) Field of Classification Search ......... 718/1–108; 707/1, 2, 3, 6; 715/277; 705/8, 9; 709/201, 709/202, 203, 232
See application file for complete search history.

(56) References Cited

U.S. PATENT DOCUMENTS

| | | | |
|---|---|---|---|
| 6,349,320 B1 * | 2/2002 | Emberton et al. | 718/100 |
| 6,560,501 B1 * | 5/2003 | Walser et al. | 700/99 |
| 6,859,823 B1 * | 2/2005 | Nishihara et al. | 709/217 |
| 7,051,328 B2 * | 5/2006 | Rai et al. | 718/102 |
| 2002/0124756 A1 * | 9/2002 | Rai et al. | 101/484 |
| 2005/0151993 A1 * | 7/2005 | Gartstein et al. | 358/1.15 |
| 2005/0157756 A1 * | 7/2005 | Ormond | 370/474 |

* cited by examiner

*Primary Examiner*—Meng-Ai An
*Assistant Examiner*—Abdullah Al Kawsar
(74) *Attorney, Agent, or Firm*—Fish & Richardson P.C.

(57) ABSTRACT

Systems and techniques for distributing items for processing include receiving a request for a batch of items to be processed and determining whether a number of available items exceeds a first predetermined threshold. A batch of the available items is sent in response to the request if the number of available items exceeds the first predetermined threshold. However, if the number of available items does not exceed the first predetermined threshold, a determination is made as to whether a time period associated with the available items exceeds a second predetermined threshold. If so, a batch of the available items is sent.

17 Claims, 3 Drawing Sheets

US 7,765,549 B1

DISTRIBUTING BATCHES OF ITEMS IN A WORKFLOW

TECHNICAL FIELD

This description relates to workflows, and more particularly to distributing batches of items for processing.

BACKGROUND

Processing documents, such as checks, insurance claims, invoices, and other forms, can be at least partially automated. Automation is particularly desirable for large-scale processing of documents (e.g., in cases where hundreds, thousands, or even millions of documents must be quickly processed). Typically, however, processing of documents is labor-intensive, even when a partially automated procedure is used. Processing of documents can involve, for example, coding entries on a form, reviewing a document for compliance with requirements, approving payments, keying printed information into a computer, and the like. Even when these types of tasks are automated, manual processing is typically still necessary, for example, as a form of quality control, to provide certain approvals, and/or to address errors or inconsistencies that arise in the automated process. Enterprises that process large numbers of documents through labor-intensive workflows can benefit from techniques that tend to increase efficiency.

SUMMARY

Techniques are described for distributing items to be processed, such as electronic documents, in response to requests for a batch of items. Requests may identify a number of items requested. If the requested number of items is available, a batch of items can be provided in response to the request. If the requested number of items is not available, a batch of items is not provided in response to the request unless one or more of the available items have aged to a point that further delays in processing the items are considered unacceptable. The described techniques can be used to tend to ensure that processing is performed on batches of items that include an efficient number of items while, at the same time, preventing items from becoming aged beyond an acceptable limit.

In one general aspect, items are distributed for processing by receiving a request for a batch of items to be processed and determining whether a number of available items exceeds a first predetermined threshold. If the number of available items exceeds the first predetermined threshold, a batch of the available items is sent in response to the request. If the number of available items does not exceed the first predetermined threshold, it is determined if a time period associated with the available items exceeds a second predetermined threshold, and, if so, a batch of the available items is sent.

Implementations can include one or more of the following features. The items to be processed are to be manually processed by a user through a user interface as part of a workflow. The batch of items sent includes a number of items that does not exceed the first predetermined threshold. The time period associated with the available items is a time that an oldest of the available items has been available for processing or is an average time that a set of the available items has been available for processing. The items to be processed are electronic documents and/or images of physical documents. The request is sent from a client device to a server. The request for a batch of items includes parameters for defining items requested and/or specifying a number of items requested. Items are sent that satisfy the parameters defining the items requested, and the batch of available items includes a number or quantity of items that exceeds the first predetermined threshold. The first predetermined threshold is less than the number of items requested. The request for a batch of items to be processed is a request for items to be at least partially manually processed in a stage of a workflow, and the available items are identified in a queue associated with the stage of the workflow. The sent batch of items is received after completion of the stage of the workflow.

The described techniques can be implemented as a method, a system, in computer software, or as a machine-readable medium storing instructions that, when executed by a processor, perform the described operations.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Figure 1:
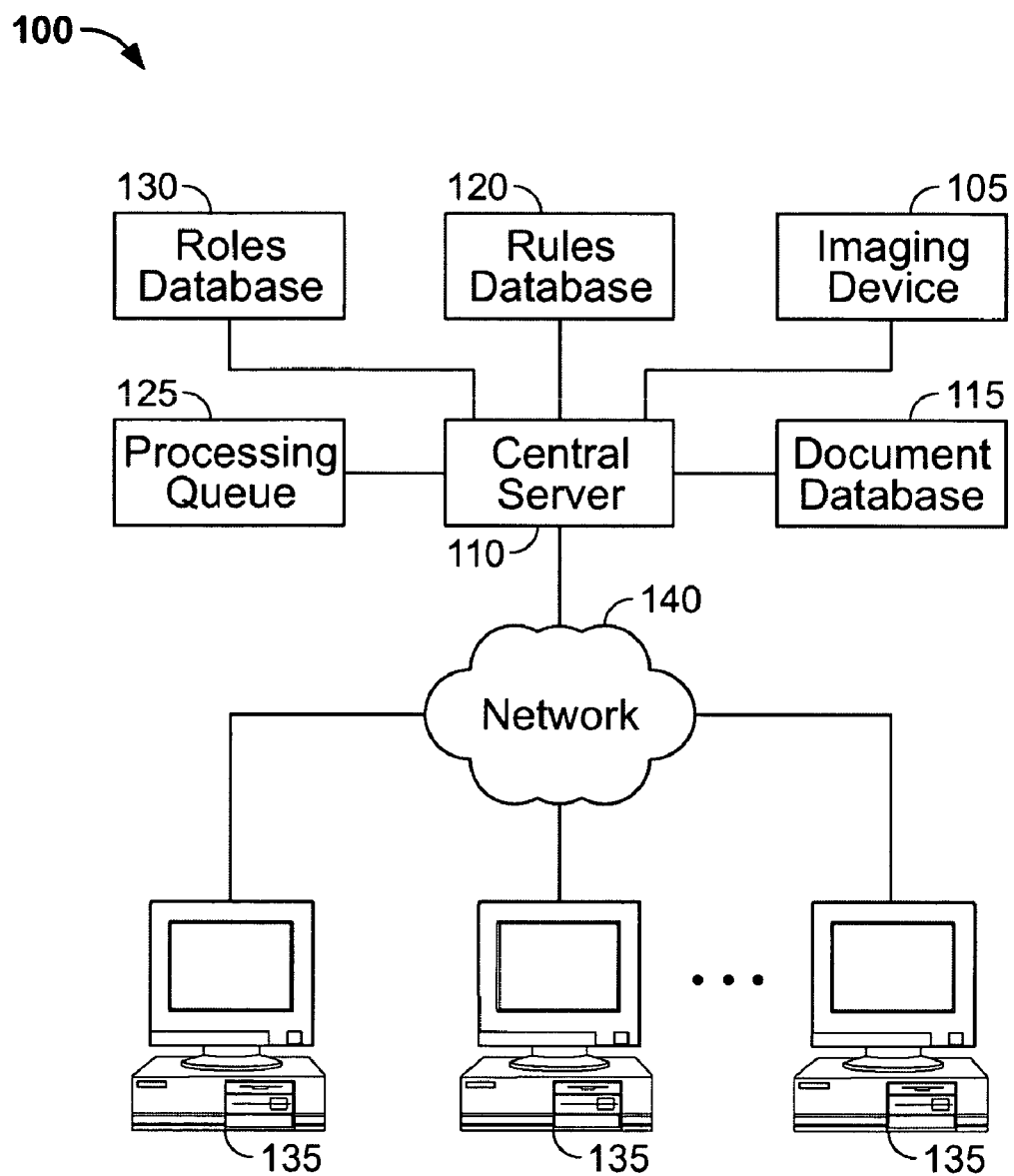
FIG. 1 is a block diagram of a document processing system for processing batches of documents.

Many large enterprises process large numbers of documents on a consistent basis. For example, large health insurers can receive thousands of claims per day and large lenders can receive thousands of payments per day. Numerous other situations exist in which the nature of an enterprise's operations necessitates processing large numbers of documents on a consistent or recurring basis. To increase efficiency, documents are typically grouped in batches that are processed in individual steps or stages. Processing steps can include, for example, sorting documents, scanning or otherwise imaging documents, keying data, verifying data entries, approving or denying requests, and performing quality control functions.

One way of managing large-scale document processing is to obtain images of documents (e.g., by scanning documents). The documents can be sorted before or after imaging, and the images can be stored at a central server. In response to a request from a client device for a batch of documents, the central server sends a batch of documents to the client device. A user at the client device can then perform some required type of processing on the batch of documents, and, when the processing is complete, the client device can return the batch of documents to the central server. By using images and an electronic delivery system, documents can be quickly and easily distributed to sites where workers are located. Each worker can focus on a batch of documents that all require the same or a related type of processing tasks. By limiting workers to performing isolated tasks on an entire batch of documents, efficiency can be increased by improving throughput and reducing errors because workers can repeat the same task and do not need to constantly readjust to the requirements of a different task.

There are some limitations, however, to the efficiencies that can be obtained through grouping documents in batches.

Some of these limitations are primarily psychological. For example, if the batch sizes are too small, and workers are able to complete a batch in a relatively short period, workers can feel a false sense of accomplishment. In other words, workers may feel that they are performing at a particularly efficient rate and therefore do not need to continue working as hard. If the batch sizes are too large, on the other hand, such that each batch takes a relatively long time to complete, workers can become distracted and/or discouraged by an impression that they seem to never be able to complete a task or project. As a result, throughput and accuracy in a document workflow can decrease if the size of the batches is either too large or too small.

In this type of electronic distribution workflow, batch sizes can be preset to levels that result in relatively high efficiency. One issue that can arise is that there may not be enough documents that require a particular type of processing when a request for a batch of documents needing the particular type of processing is received. One option is to simply send what is available. This option, however, tends to lead to the low efficiency issue discussed above, particularly because this option tends to magnify the problem (e.g., if a batch of all available documents is sent, the next time a request is received, the number of available documents may still be too low or even smaller, and thus the batch sizes never get a chance to recover). Another option is to reject the request or to otherwise wait until a complete batch of documents is available before sending a batch of documents. This latter option can also be problematic in that it may cause processing of certain documents to be delayed for relatively long periods. In some implementations, such a delay is unacceptable, for example, because it can disrupt later stages of the workflow or because documents need to be processed quickly to meet customer or client expectations.

To decrease the possible efficiency problems associated with having batch sizes that are too small and to avoid unacceptable processing delays, another option is to use a time out process in which, if less than a minimal number of documents are available, a batch of documents is not sent unless the oldest of the available documents has been available for greater than a threshold amount of time. Thus, if there are not enough documents available, a batch of documents is only sent if a time out criterion is fulfilled.

Although the techniques are described primarily in the context of documents, the techniques can be used in connection with other items that are distributed in batches for processing. In addition, the techniques are described primarily in the context of processing stages that are at least partially manual. The techniques can also be used, however, in connection with distributing items for automated processing. Automated processing scenarios may have certain economies of scale that make it quicker or a more efficient use of resources to process items in batches of a particular size or size range. Accordingly, automated processing implementations can also benefit from the described techniques.

FIG. 1 is a block diagram of a document processing system 100 for processing batches of documents. Images of documents are obtained using an imaging device 105, such as a scanner. A central server 110 routes the document images to a document database 115, where the document images are indexed and stored. In some implementations, electronic documents or other sets of data can be received at the central server 110 through some other type of interface device, rather than the imaging device 105. For example, an electronic document can be received as a submission of a completed form on a web page. An electronic document also does not need to be in an image format but can be stored, for example, as an XML document, a flat file, a data set, or a data record.

The central server 110 manages processing of the documents in the document database 115. For example, the central server 110 executes processing rules that define a workflow for the documents. The processing rules are stored in a rules database 120 connected to (or contained within) the central server 110. The rules database may include rules relating to how documents are assembled into batches, the size of the batches, and how the batches are distributed. Different documents can have different workflows depending on the document type or other parameters associated with the documents. In accordance with the processing rules, the central server 110 places documents or document identifiers in a processing queue 125. Thus, when a document in the document database 115 is ready or due for a particular processing task, the document or an identifier of the document (e.g., a unique document number or a record index) is added to the processing queue 125. In some implementations, it may not be necessary to have a separate processing queue 125. Instead, the queue may be maintained as part of the document database 115 and/or by setting a flag associated with each document to be processed.

The workflow may require, for example, that a particular type of document be first sent to a data entry worker for keying data from the document into a database (e.g., document database 115 or some other database); then sent to another worker to verify that the document complies with formal requirements, that the document is not a duplicate, etc.; and finally sent to a manager for a quality control review. The central server 110 may have separate queues within the overall processing queue 125 for the keying task, the verifying task, and the quality control task.

The central server 110 can ensure that documents are sent to an appropriate worker using a roles database 130 that defines which processing tasks and/or which document types each worker is assigned to and/or authorized for. As a result, the central server 110 can send documents or batches of documents to appropriate workers.

Workers access the system 100 through client devices 135 that communicate with the central server 110 through a network 140, such as a local area network (LAN), wide area network (WAN), or the Internet. The client devices 135 can be desktop computers, workstations, or other user interface devices. A worker or user at a particular client device 135 can register or login to the central server 110 with a user name and password, and, using the login information, the central server 110 can identify the user and retrieve the user's role data from the roles database 130. A user requests documents through a user interface at the client device 135, or the central server 110 automatically assigns documents in accordance with data stored in the rules database 120. The central server 110 identifies a batch of documents from the processing queue 125 that are appropriate for the user based on the processing rules and the user's role. The central server 110 then sends the batch of documents through the network to the client device 135 associated with the user. The user performs the necessary tasks on the batch of documents through a user interface and returns the processed documents to the central server 110. The processed documents can be stored in the document database 115 or sent to another client device 135 for the next processing stage in the workflow. The user's tasks generally involve some type of manual processing, such as keying data, reviewing data displayed on a screen, and/or indicating completion of a task for a particular document or group of documents (e.g., using a particular keystroke or a click with a pointing device). In some cases, however, the client device 135 may be a processor that performs a certain task or tasks without human intervention.

In some cases, the user may be able to request a batch of documents that match a particular task and/or document type. As a result, a request is sent from the client device 135 to the central server 110 that includes parameters defining the type of batch requested. Alternatively, the parameters may be automatically generated at the client device 135. In other cases, the request may simply be a message indicating that the user is ready for a new batch of documents. The message may be manually entered or automatically generated when the user completes processing of a batch of documents. The central server can then automatically assign appropriate parameters in response to the message using information from the rules database 120 and/or the roles database 130. In any event, the parameters can include a specified number of documents that are requested (i.e., a requested size of the batch), names of particular documents, document types, processing types, and/or other criteria for selecting documents or a batch of documents.

The central server 110 responds to requests by determining if the processing queue 125 includes a threshold number of available documents that satisfy the parameters. The threshold number may be equal to a requested number of documents. Alternatively, the threshold number may be less than a requested number of documents. If the processing queue 125 includes a sufficient number of available documents, the central server 110 sends a batch of documents, typically numbering at least as many as the threshold number but not more than the requested number, to the requesting client device 135. If the processing queue 125 does not include a sufficient number of documents that satisfy the parameters, a timer or a time period associated with the oldest available document that satisfies the parameters is checked to determine whether it surpasses a certain threshold value. The time period can be a difference between a current time and a time stored in the processing queue 125 in connection with each document. If the time period surpasses the threshold value, the central server 110 sends all of the documents that satisfy the parameters to the requesting client device 135. If the number of available documents does not at least equal the threshold number and the time period does not surpass the threshold value, the request from the client device 135 is rejected or ignored, or the central server 110 performs a new search using alternative parameters and/or identifies an alternative batch of documents to send to the client device 135.

Figure 2:
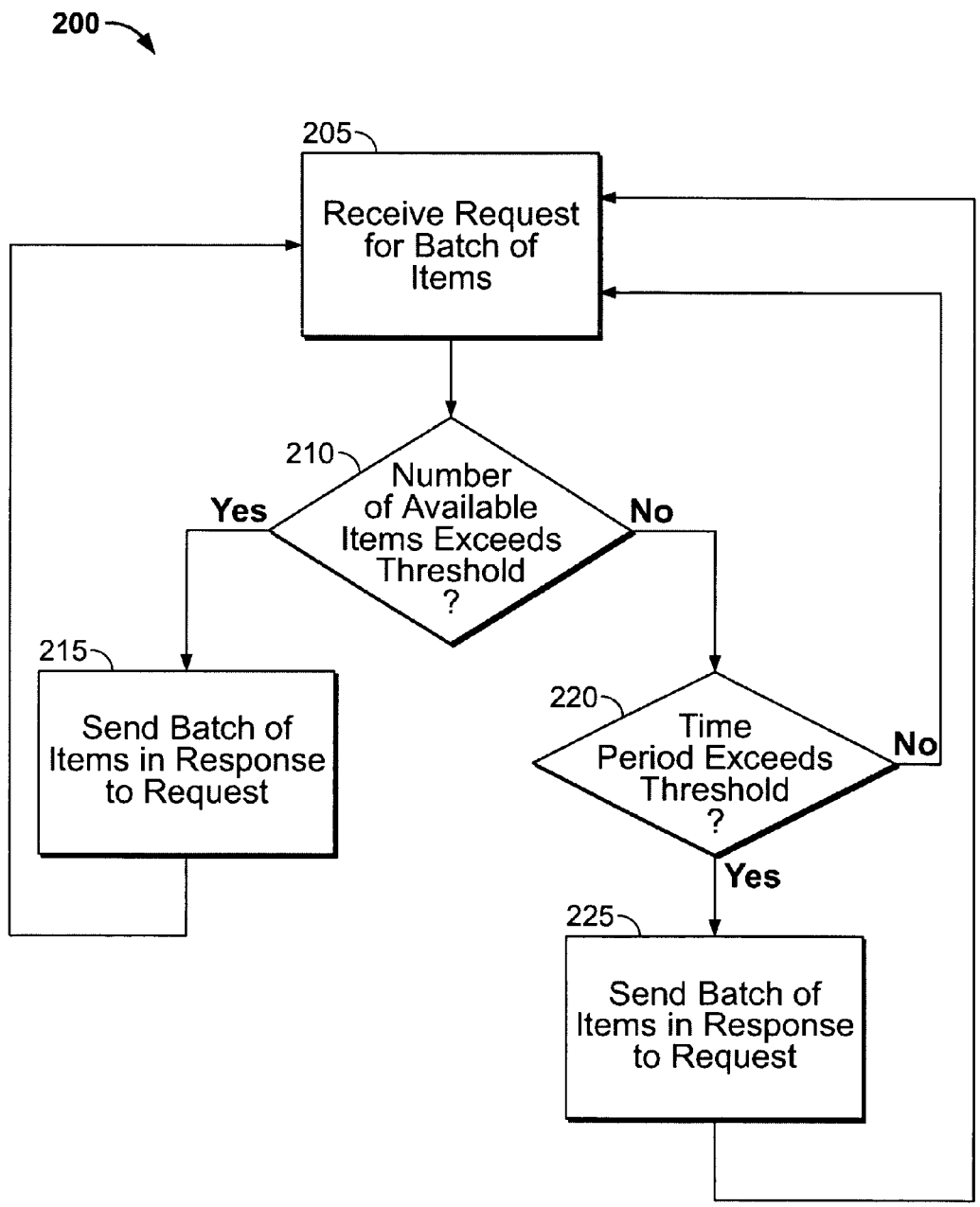
FIG. 2 is a flow diagram of a process of distributing items for processing.

FIG. 2 is a flow diagram of a process 200 of distributing items for processing. A request for a batch of items to be processed is received (step 205). The request may include parameters that define the type of items requested and/or that define characteristics of the overall batch that is requested. Additional parameters may be automatically added in accordance with distribution rules for the items. Alternatively, the request may simply be an indication that a batch of items is requested, and the server or other device that receives the request can specify parameters, if necessary. Typically, the request relates to a batch of items to be processed in an overall workflow, and the processing to be performed constitutes only a portion of the overall workflow. In addition, the items generally are electronic documents or other electronic representations of data and are to be processed through some manual interaction of a user with a user interface.

A determination is made as to whether a number of available items exceeds a first predetermined threshold (step 210). The available items are items that comply with the parameters and that are ready for the particular type of processing to which the request relates. For example, if a workflow includes five sequential processing steps, the available items for a request for items to be processed in accordance with the third processing step are those that have been processed in accordance with the first two steps but not the third. While the total number of items that are ready for the third processing step may exceed the first predetermined threshold, the number of available items may also be further limited by additional parameters. The documents may be identified in a queue for all documents that are ready for processing or in separate queues that are differentiated based on the type of processing and/or characteristics of the documents.

The first predetermined threshold establishes a minimum number of items to be included in a batch. The first predetermined threshold may be specified in the request (e.g., by automatically inserting a parameter defining the threshold in accordance with the type of processing to be performed) or may otherwise be predefined in the system that controls distribution of items. The first predetermined threshold may be equal to a requested batch size or may be some value less than a requested batch size. The first predetermined threshold can be a fixed value or can be determined in accordance with an algorithm such that the threshold itself is not preset, but the algorithm for determining the threshold is. In addition, different thresholds can be used depending on various parameters (e.g., types of processing, types of documents, and the like). The determination made in step 210 relates to whether a batch can be assembled in response to the request that includes items that are ready for a particular type of processing, that comply with specified parameters, and that are more numerous than the first predetermined threshold.

As used herein, whether a number exceeds a threshold is considered to be the same as whether a number is equal to or exceeds a slightly different threshold. For example, if a threshold value is ten, an integer number that exceeds the threshold value is eleven or more. In this example, whether a number exceeds a value of ten is synonymous with whether a number is equal to or greater than eleven.

If the number of available items exceeds the first predetermined threshold, a batch of items is assembled and sent in response to the request (step 215). The batch of items can be assembled by selecting the oldest items, as measured by the time the items have been available for the processing step or have been in the workflow, or by selecting items according to some other priority criteria. Generally, the assembled batch of items will include a number of items specified in the request or otherwise predefined in the workflow, and the number of items is greater than the first predetermined threshold. The process 200 then returns to step 205 to begin again once a new request for a batch of items is received.

If the number of available items does not exceed the first predetermined threshold, a determination is made as to whether a time period associated with one or more of the available items exceeds a second predetermined threshold (step 220). The time period can be a period that an oldest of the available items has been available, as determined by the amount of time an item has been available for a particular processing step, the amount of time an item has been in the workflow, or using some other criteria. The time period can alternatively be an average amount of time for multiple different available items. In some implementations, different items may have different time period thresholds depending on differing level of priority among the various items. The determination made in step 220 is generally used to support a time out procedure that ensures that items do not age beyond some acceptable limit, as defined for a particular workflow, while favoring batches that are as close as possible to the first predetermined threshold, which typically sets a lower limit on the number of items considered to constitute an acceptable batch size.

If the time period does exceed the second predetermined threshold, a batch of items is assembled and sent in response to the request (step 225). Generally, the batch of items sent at step 225 will include all of the available items but will include fewer items than specified by the first predetermined threshold. If the number of available items does not exceed the first predetermined threshold and the time period does not exceed the second predetermined threshold, the request is rejected, and the process 200 returns to step 205 to await receipt of a new request for a batch of items. When the request is rejected, the requesting entity or device can submit a new request, or a batch of items that meet a different set of parameters may be sent to the requesting entity or device. In some cases, there may be no batches available that can be processed by the requesting entity or device. In such a case, the requesting entity or device may be idle for some period. Remaining idle, however, may be preferred in some implementations as an alternative to sending too small of a batch of items.

In an example of one possible implementation of the described techniques, a request for a batch of fifty items that satisfy certain parameters may be received. There might be only forty-six items that satisfy the parameters, however. As a result, the system may favor not sending a batch of items in response to the request because the number of available items is less than the number requested. Accordingly, the oldest of the forty-six available items is identified, and a determination is made as to whether the identified item has been available for more than three hundred seconds, which represents a time out threshold. If so, the forty-six items are sent in response to the request. If the time out threshold has not been surpassed, a batch of items is not sent in response to the request. In another implementation, forty-six items may exceed a threshold number (e.g., thirty) of required items even though it is less than the requested number. In such a case, a batch of forty-six items might be sent in response to the request although, if only twenty-five were available, they would not be sent.

For purposes of this description, an electronic document does not necessarily correspond to a file. A document may be stored in a portion of a file that holds other documents, in a single file dedicated to the document in question, or in multiple coordinated files. Electronic documents include but are not limited to digital images of physical (e.g., paper) documents, sets of data entered into online forms and stored, e.g., as one or more XML files, and other associated groups of data entries.

The described techniques can be implemented in digital electronic circuitry, integrated circuitry, or in computer hardware, firmware, software, or in combinations thereof. Apparatus for carrying out the techniques can be implemented in a software product (e.g., a computer program product) tangibly embodied in a machine-readable storage device for execution by a programmable processor; and processing operations can be performed by a programmable processor executing a program of instructions to perform the described functions by operating on input data and generating output. The techniques can be implemented advantageously in one or more software programs that are executable on a programmable system including at least one programmable processor coupled to receive data and instructions from, and to transmit data and instructions to, a data storage system, at least one input device, and at least one output device. Each software program can be implemented in a high-level procedural or object-oriented programming language, or in assembly or machine language if desired; and in any case, the language can be a compiled or interpreted language.

Suitable processors include, by way of example, both general and special purpose microprocessors. Generally, a processor will receive instructions and data from a read-only memory, a random access memory and/or a machine-readable signal (e.g., a digital signal received through a network connection). Generally, a computer will include one or more mass storage devices for storing data files; such devices include magnetic disks, such as internal hard disks and removable disks, magneto-optical disks, and optical disks. Storage devices suitable for tangibly embodying software program instructions and data include all forms of non-volatile memory, including by way of example semiconductor memory devices, such as EPROM (electrically programmable read-only memory), EEPROM (electrically erasable programmable read-only memory), and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the techniques can be implemented on a computer system having a display device such as a monitor or LCD (liquid crystal display) screen for displaying information to the user and a keyboard and a pointing device such as a mouse or a trackball by which the user can provide input to the computer system or a system which enables input and presents information via voice, symbols, or other means such as a Braille input and output system. The computer system can be programmed to provide a graphical user interface through which computer programs interact with users. With new technologies such as voice input and output, it is not a requirement to have a visual display to implement the described techniques.

The invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Figure 3:
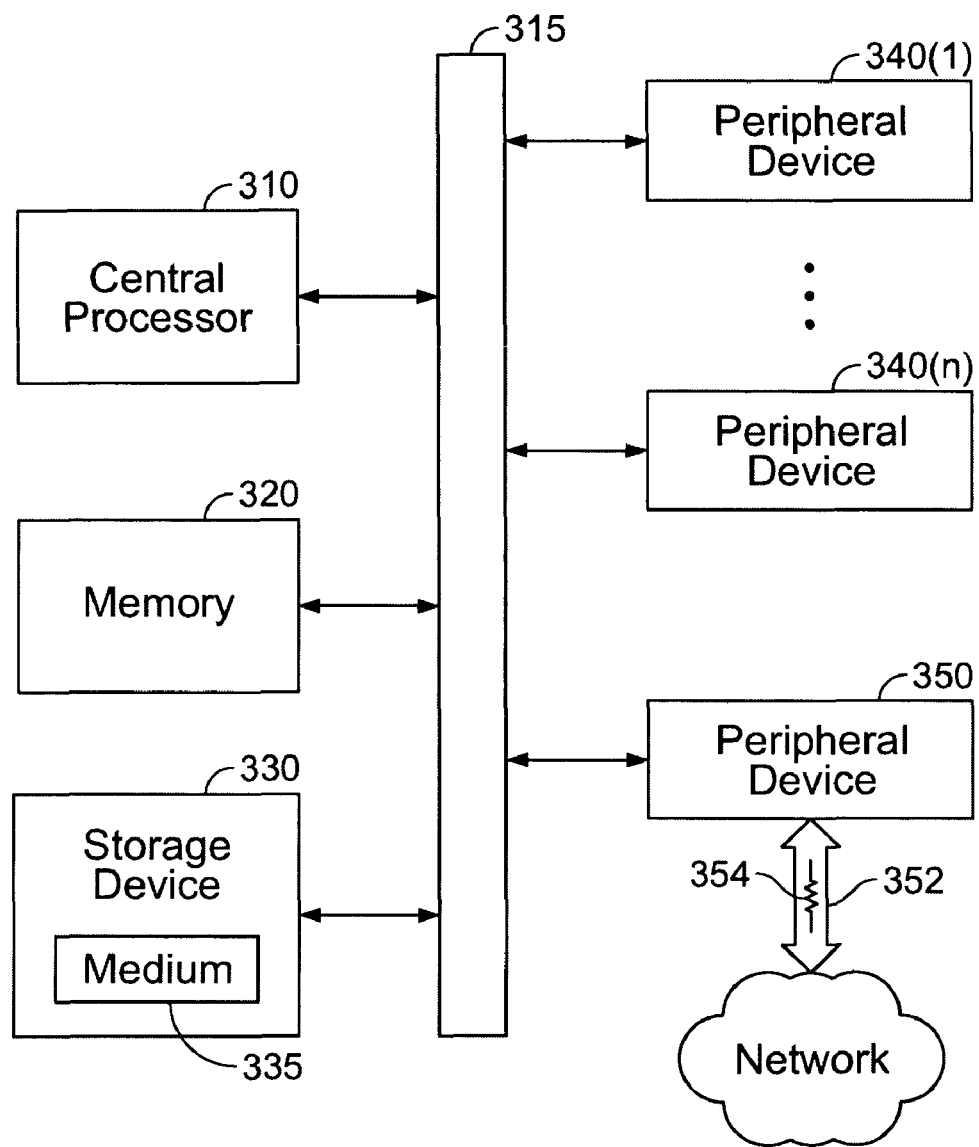
FIG. 3 is a block diagram illustrating an example data processing system in which a system for managing items in a workflow, distributing items for processing, and/or processing received batches of items can be implemented.

FIG. 3 is a block diagram illustrating an example data processing system 300 in which a system for managing items in a workflow, distributing items for processing, and/or processing received batches of items can be implemented. In particular, one or more of the operations described above can be performed by the data processing system 300. The data processing system 300 includes a central processor 310, which executes programs, performs data manipulations, and controls tasks in the system 300. The central processor 310 is coupled with a bus 315 that can include multiple busses, which may be parallel and/or serial busses.

The data processing system 300 includes a memory 320, which can be volatile and/or non-volatile memory, and is coupled with the communications bus 315. The system 300 can also include one or more cache memories. The data processing system 300 can include a storage device 330 for accessing a storage medium 335, which may be removable, read-only, or read/write media and may be magnetic-based, optical-based, semiconductor-based media, or a combination of these. The data processing system 300 can also include one or more peripheral devices 340(1)-340(n) (collectively, devices 340), and one or more controllers and/or adapters for providing interface functions.

The system 300 can further include a communication interface 350, which allows software and data to be transferred, in the form of signals 354 over a channel 352, between the system 300 and external devices, networks, or information sources. The signals 354 can embody instructions for causing the system 300 to perform operations. The system 300 represents a programmable machine, and can include various devices such as embedded controllers, Programmable Logic Devices (PLDs), Application Specific Integrated Circuits (ASICs), and the like. Machine instructions (also known as programs, software, software applications or code) can be stored in the machine 300 and/or delivered to the machine 300 over a communication interface. These instructions, when executed, enable the machine 300 to perform the features and function described above. These instructions represent controllers of the machine 300 and can be implemented in a high-level procedural and/or object-oriented programming language, and/or in assembly/machine language. Such languages can be compiled and/or interpreted languages.

As used herein, the term "machine-readable medium" refers to any computer program product, apparatus, and/or device used to provide machine instructions and/or data to the machine 300, including a machine-readable medium that receives machine instructions as a machine-readable signal. Examples of a machine-readable medium include the storage medium 335, the memory 320, and/or PLDs, FPGAs, ASICs, and the like.

A number of implementations have been described. Nevertheless, it will be understood that various modifications may be made. For example, although a particular sequence of steps is described in connection with FIG. 2, the steps can be re-ordered in a different sequence and/or certain functions can be performed in parallel. Accordingly, other implementations are within the scope of the following claims.

What is claimed is:

1. A computer implemented method for distributing items for processing, the method comprising:
   receiving a request transmitted across a network for a batch of items to be processed, wherein the request is received at a server, the request comprising parameters for performing at least one of defining items requested and specifying a number of items requested;
   determining using a processor associated with the server whether a number of available items exceeds a first predetermined threshold, where the first predetermined threshold specifies a non-zero number of items;
   sending a batch of the available items across the network in response to the request if the number of available items exceeds the first predetermined threshold, the batch of available items sent includes a number of items that exceeds the first predetermined threshold and the items sent in the batch satisfy the parameters defining the items requested; and
   if the number of available items does not exceed the first predetermined threshold:
      determining using the processor if a time period associated with the available items exceeds a second predetermined threshold, the second predetermined threshold defining a predetermined time period; and
      sending a batch of the available items across the network if the time period exceeds the second predetermined threshold.

2. The method of claim 1 wherein the items to be processed comprise items to be manually processed by a user through a user interface as part of a workflow.

3. The method of claim 1 wherein sending a batch of the available items if the time period exceeds the second predetermined threshold comprises sending a batch of items comprising a number of items that does not exceed the first predetermined threshold.

4. The method of claim 1 wherein the time period associated with the available items comprises a time that an oldest of the available items has been available for processing.

5. The method of claim 1 wherein the time period associated with the available items comprises an average time that a set of the available items has been available for processing.

6. The method of claim 1 wherein the items to be processed comprise electronic documents.

7. The method of claim 1 wherein the request is sent from a client device to a server.

8. The method of claim 1 wherein the first predetermined threshold is less than the number of items requested.

9. A system for processing batches of items, the system comprising:
   a processor adapted to receive a request for a batch of items to be processed, the request including parameters for performing at least one of defining items requested and specifying a number of items requested; and
   a processor adapted to:
      determine whether a number of available items that satisfy the parameters defining the items requested exceeds a first predetermined threshold, where the first predetermined threshold specifies a non-zero number of items;
      if the number of available items that satisfy the parameters exceeds the first predetermined threshold, send a batch of the available items including a number of items satisfying the parameters that exceeds the first predetermined threshold; and
      if the number of available items does not exceed the first predetermined threshold, send a batch of the available items in response to the request and to a determination that a time period associated with the available items exceeds a second predetermined threshold, where the second predetermined threshold defines a predetermined time period.

10. The system of claim 9 wherein:
   the request for a batch of items to be processed comprises a request for items to be at least partially manually processed in a stage of a workflow; and
   the available items comprise items in a queue for the stage of the workflow.

11. The system of claim 10 further comprising means for receiving the sent batch of items after completion of the stage of the workflow.

12. The system of claim 11 wherein the items comprise electronic documents.

13. The system of claim 12 wherein the items comprise images of physical documents.

14. The system of claim 10 wherein time period associated with the available items comprises a period that an oldest available item has been in the queue.

15. An article comprising a machine-readable medium storing instructions for causing one or more processors to perform operations comprising:
- receiving a request for a batch of items to be processed, the request comprising parameters for performing at least one of defining items requested and specifying a number of items requested;
- determining whether a number of available items exceeds a first predetermined threshold, where the first predetermined threshold specifies a non-zero number of items;
- sending a batch of the available items in response to the request if the number of available items exceeds the first predetermined threshold, where the batch of available items sent includes a number of items that exceeds the first predetermined threshold and the items sent satisfy the parameters defining the items requested; and
- if the number of available items does not exceed the first predetermined threshold:
    - determining if a time period associated with the available items exceeds a second predetermined threshold, the second predetermined threshold defining a predetermined time period; and
    - sending a batch of the available items if the time period exceeds the second predetermined threshold.

16. The article of claim 15 wherein the items to be processed comprise items to be manually processed by a user through a user interface as part of a workflow.

17. The article of claim 15 wherein the request is received from a client device.

* * * * *